US008131325B2

(12) United States Patent
Slack

(10) Patent No.: US 8,131,325 B2
(45) Date of Patent: Mar. 6, 2012

(54) METHOD, APPARATUS AND SYSTEM FOR BATTERY RESOURCE MANAGEMENT VIA TRAFFIC STEERING

(75) Inventor: Phillip Slack, Slough (GB)

(73) Assignee: Research In Motion Limited, Waterloo (CA)

( * ) Notice: Subject to any disclaimer, the term of this patent is extended or adjusted under 35 U.S.C. 154(b) by 436 days.

(21) Appl. No.: 12/394,198

(22) Filed: Feb. 27, 2009

(65) Prior Publication Data

US 2010/0220640 A1 Sep. 2, 2010

(51) Int. Cl.
*H04B 1/38* (2006.01)
*G08C 17/00* (2006.01)
(52) U.S. Cl. .................... 455/574; 455/572; 370/311
(58) Field of Classification Search .... 455/343.1–343.5, 455/572, 574; 370/311
See application file for complete search history.

(56) References Cited

U.S. PATENT DOCUMENTS

| 6,748,246 B1* | 6/2004 | Khullar ...................... 455/574 |
| 6,771,964 B1 | 8/2004 | Einola et al. |
| 6,782,429 B1 | 8/2004 | Kisor |
| 6,801,777 B2 | 10/2004 | Rusch |
| 6,961,583 B2 | 11/2005 | Moles et al. |
| 6,973,502 B2 | 12/2005 | Patil |
| 6,978,138 B2 | 12/2005 | Japenga et al. |
| 7,047,037 B2 | 5/2006 | Ormson |
| 2002/0059453 A1 | 5/2002 | Eriksson et al. |
| 2003/0100308 A1 | 5/2003 | Rusch |
| 2005/0117544 A1 | 6/2005 | Goris et al. |
| 2005/0170853 A1* | 8/2005 | Verma et al. ............. 455/456.6 |
| 2007/0058628 A1* | 3/2007 | Palnati et al. ................. 370/390 |
| 2007/0255797 A1 | 11/2007 | Dunn et al. |
| 2008/0102815 A1 | 5/2008 | Sengupta et al. |
| 2009/0005098 A1* | 1/2009 | McGowan et al. ........... 455/517 |
| 2010/0062760 A1* | 3/2010 | Fuccellaro et al. ........ 455/426.1 |
| 2010/0145702 A1* | 6/2010 | Karmarkar .................... 704/258 |

FOREIGN PATENT DOCUMENTS

| CA | 2589961 | 5/2007 |
| EP | 1926283 A1 | 5/2008 |
| FR | 2865599 | 7/2005 |
| GB | 2346507 A | 8/2000 |
| GB | 2436187 A | 9/2007 |
| WO | 0203733 A1 | 1/2002 |
| WO | 2004040931 A3 | 5/2004 |
| WO | 2005117463 A2 | 12/2005 |
| WO | 2006098599 A1 | 9/2006 |
| WO | 2008011420 A1 | 1/2008 |

OTHER PUBLICATIONS

Andrea Acquaviva, et al., "Server Controlled Power Management for Wireless Portable Devices", Mobile and Media Systems Laboratory, HP Laboratories Palo Alto, HPL-2003-82, Apr. 17, 2003.

(Continued)

*Primary Examiner* — Vibol Tan
(74) *Attorney, Agent, or Firm* — Novak Druce + Quigg LLP

(57) ABSTRACT

Battery resources in a wireless device are managed in the present specification by traffic steering. A wireless device is configured to request content from an intermediation server, which is configured to analyze the requested content and send an indication to the wireless device as to which bearer path is to be selected based on which bearer path is battery-life optimized.

11 Claims, 9 Drawing Sheets

OTHER PUBLICATIONS

W. Qadeer, et al. "Heterogeneous Wireless Network Management", Stanfor Unversity, HP Labs.

Thomas Stockhammer, et al. On Practical Crosslayer Aspects in 3GPP Video Services, International Multimedia Conference, Augsburg, Bavaria, Germany, 2007, (http://portal.acm.org/citation.cfm?id=1290053).

Inoue, Masugi, et al. ; Prototype of Context-Based Adaptive Communication System on Seamless Networking Platform; IEEE, 2004, pp. 1070-1074. http://ieeexplore.ieee.org/Xplore/login.jsp?url=/iel5/9435/29981/01373863.pdf?arnumber=1373863.

WirelessMoves, Thoughts on the evolution wireless networks and the mobile web 2.0. http://mobilesociety.typepad.com/mobile_life/2007/03/deep_inside_the.html.

Tianzhou, Chen, et al.; Unified Mobile Protocol Stack With Network Sub-Protocol Component Framework; Proceedings of the 23rd IASTED International Multi-Conference, Parallel and Distributed Computing and Networks, Feb. 15-17, 2005, Innsbruck, Austria, pp. 64-69. http://www.actapress.com/PaperInfo.aspx?PaperID=19175&reason=500.

Resource Management Techniques and Guidelines for Implementation, pp. 169-172. http://books.google.com/books?id=dZttjsVpy0QC&pg=PA170&lpg=PA170&dq=cell+or+network+or+rat+and+(reselection%7Crank%7 Corder)+-patent&source=web&ots=fztDZ12mwH&sig=bKZqhPIMP46sfEkS3YoD-PAahQQ#PPA169,M1.

Northstream, Operator Options Beyond 3G, Whitepaper, Feb. 2005, pp. 1-30. http://www.3gamericas.org/pdfs/northstream_operator_options_beyond3G_feb2005.pdf.

* cited by examiner

METHOD, APPARATUS AND SYSTEM FOR BATTERY RESOURCE MANAGEMENT VIA TRAFFIC STEERING

FIELD

The present specification relates generally to telecommunications and more specifically relates to a method and system for managing battery resources in an electronic device via traffic steering.

BACKGROUND

With the desire to increase wireless access speeds, a proliferation of bearer paths has resulted. A non-limiting list of example bearer paths includes Global System for Mobile communications (GSM), General Packet Radio Service (GPRS), Enhanced Data Rates for GSM Evolution (EDGE), and the Third-generation mobile communication system (3G). However, different bearer paths consume different amounts of battery resources in the wireless devices that access those bearer paths. Thus, when operating on certain bearer paths, battery resources are reduced in the wireless device.

DESCRIPTION

Figure 1:
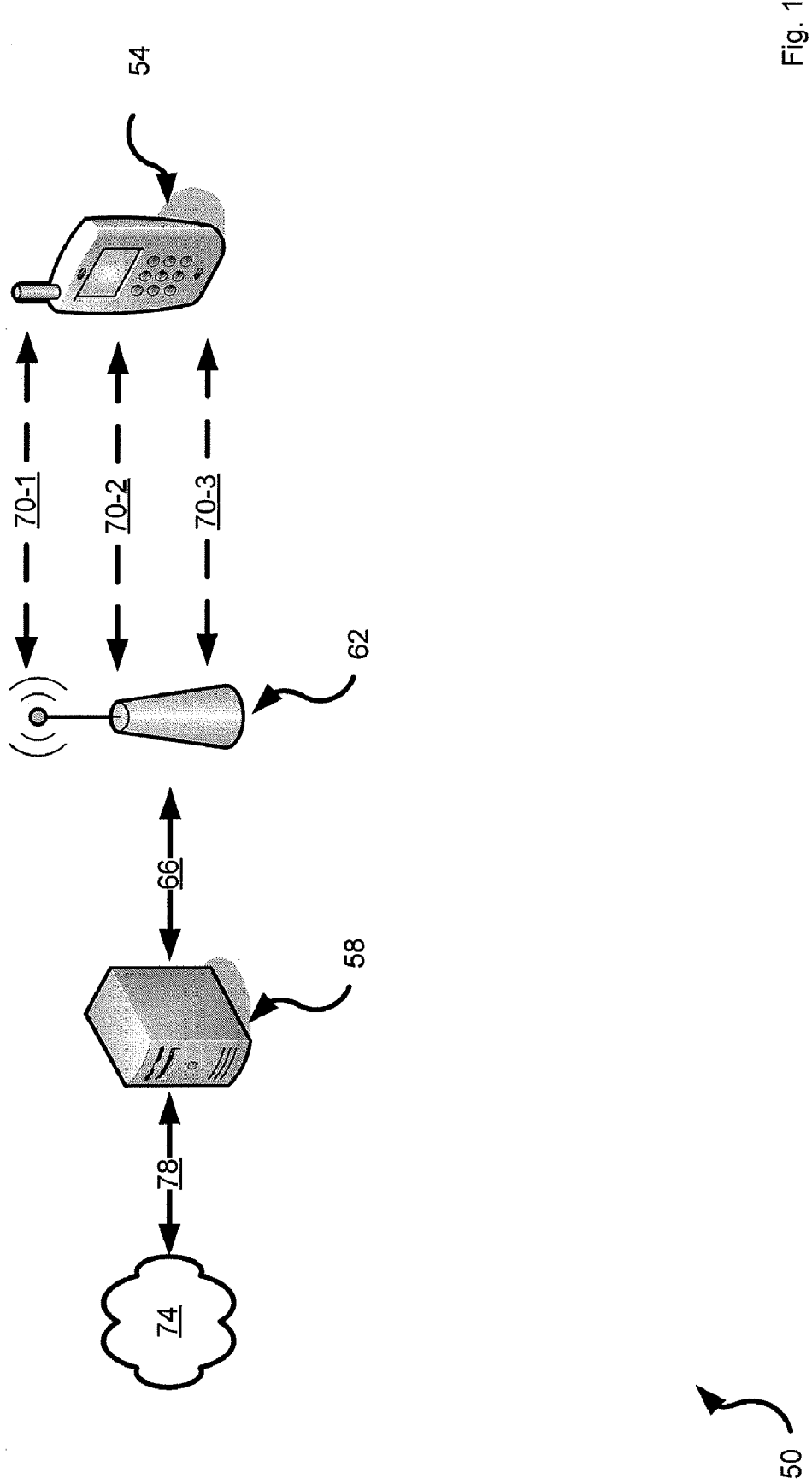
FIG. 1 shows a schematic representation of a system for battery life management.

An aspect of the specification provides a system of managing battery life of a wireless device by choosing a radio interface based on application requirements, comprising:

a wireless device configured to send a request to an intermediation server (or an application server);

an intermediation server (or an application server) configured to:

Request and fetch content from a remote content server;

Perform real-time analysis to establish content type by, for example:

a. Header parsing for size or Multipart Internet Mail Extension (MIME) type;

b. Content analysis according to gauge complexity/embedded graphics or media;

c. Assigning traffic profile to request based on real-time analysis and/or predetermined rankings;

The result can be to combine handheld capabilities and traffic profile to determine available transport bearer list ordered by the most optimal according to battery life of the device.

The wireless device is also configured to receive the suggested transport bearer list and establish or move to the most optimal available bearer.

The wireless device is also configured to receive content via the established battery-optimized bearer path.

Another aspect of the specification provides a method of managing battery resources in a wireless device connected to a network via a plurality of bearer paths, the method comprising:

receiving a content request from the wireless device via one of the bearer paths;

performing an analysis of content associated with the content request;

determining a battery-optimized bearer path based on the analysis of the content; the battery-optimized bearer path determined according to which of the bearer paths consumes less battery resources of the wireless device than another one of the bearer paths, and which is also capable of fulfilling the content request;

sending an indication of the battery-optimized bearer path to the wireless device via one of the bearer paths.

The method can further comprise receiving the indication at the wireless device and selecting the battery-optimized bearer path.

The method can further comprise receiving the content at the wireless device via the battery-optimized bearer path.

The method can further comprise sending the content to the wireless device via the battery-optimized bearer path.

The method can further comprise optimizing the content according to the hardware constraints of the wireless device prior to sending the content via the battery-optimized bearer path.

The receiving and analyzing can be executed by a first intermediation server and the determining and sending can be executed by a second intermediation server, in which case the method can further comprise sending the analysis from the first intermediation server to the second intermediation server. The method can further comprise encrypting the content at the first intermediation server for decryption by the wireless device.

The content can be at least one of web-pages, email, audio media, video media, streaming media, instant messaging, mapping services, voice-over-Internet-protocol communications, and social networking services.

The analysis can comprise analyzing complexity of embedded graphics or media within the content.

The analysis can comprise an examination of traffic profiles associated with the content request based on real-time analysis.

The analysis can comprise an examination of traffic profiles associated with the content request based on predetermined ranking ordered by the most optimal according to battery resource consumption of the device.

A first one of the bearer paths can be based on EDGE, and a second of the bearer paths can be based on 3G.

Another aspect of the specification provides an intermediation server configured to assist in managing battery resources in a wireless device connected to a network via a plurality of bearer paths. The server comprises a computing environment comprising non-volatile storage, volatile storage, and a network interface interconnected by at least one processor. The network interface is connectable to the wireless device via at least one of the bearer paths. The processor is configured to receive a content request from the wireless device via the one of the bearer paths. The processor is configured to perform an analysis of content associated with the content request and to determine a battery-optimized bearer path based on the analysis of the content. The battery-optimized bearer path can be determined according to which of the bearer paths consumes less battery resources of the wireless device than another one of the bearer paths, and which is also capable of fulfilling the content request. The processor further is configured to send an indication of the battery-optimized bearer path to the wireless device via one of the bearer paths.

Another aspect of the specification provides a wireless electronic device connected to a network via a plurality of bearer paths. The device comprises a computing environment comprising non-volatile storage, volatile storage, and a plurality of wireless network interfaces interconnected by at least one processor. The network interfaces are connectable to the network via each of the bearer paths. The processor is configured to send a content request via the one of the bearer paths and to receive an indication from an intermediation server of a battery-optimized bearer path. The selected battery-optimized bearer path can be based on the analysis of the content by the intermediation server. The battery-optimized bearer path can be determined according to which of the bearer paths consumes less battery resources of the wireless device than another one of the bearer paths, and which is also capable of fulfilling the content request. The processor further is configured to select one of the bearer-paths based on the indication.

Referring now to FIG. 1, a system for battery resource management in a wireless computing device is indicated generally at 50. In a present embodiment system 50 comprises a plurality of wireless computing devices 54 and at least one intermediation server 58. A wireless base station 62 interconnects computing device 54 and intermediation server 58. A backhaul link 66 interconnects base station 62 with server 58. A plurality of wireless bearer paths 70-1, 70-2, 70-3 (generically bearer path 70, and collectively, bearer paths 70) can be used to interconnect base station 62 with computing device 54. In a present exemplary embodiment, bearer path 70-1 is GPRS, bearer path 70-2 is EDGE, and bearer path 70-3 is 3G. Intermediation server 58 is also connected to a network 74 via another backhaul link 78. Network 74 can be any type of network that can host content that is accessible to device 54. As will be discussed further below, the type of content is not particularly limited.

Figure 2:
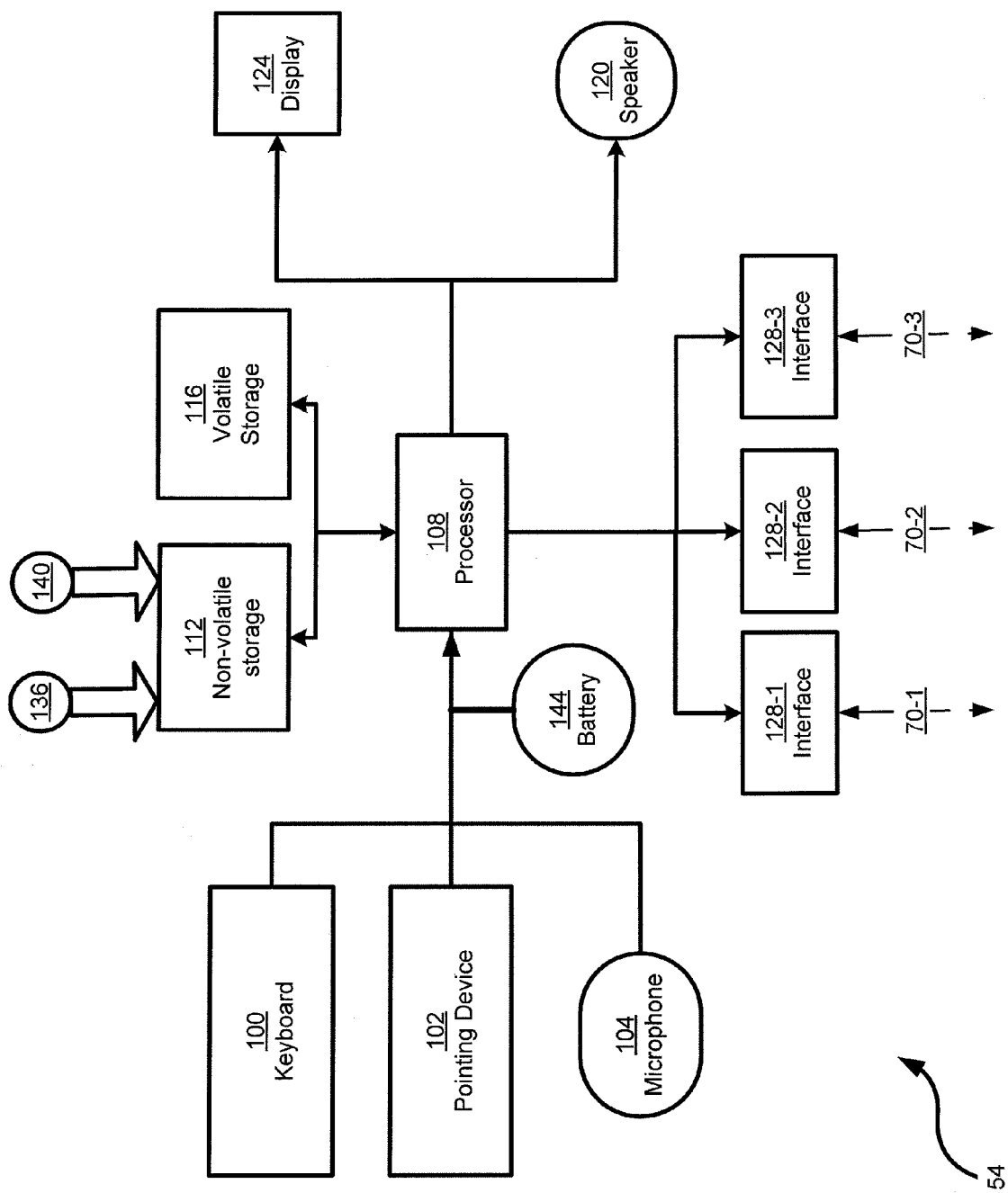
FIG. 2 shows a schematic representation of the electronic device shown in the system of FIG. 1.

Referring now to FIG. 2, computing device 54 can be any type of electronic device that can be used in a self-contained manner to interact with content available over network 74. Interaction includes displaying of information on computing device 54 as well as receiving input at computing device 54 that can in turn be sent back over network 74. It should be emphasized that the structure in FIG. 2 is purely exemplary, and contemplates a device that can be used for both wireless voice (e.g. telephony) and wireless data (e.g. email, web browsing, text) communications. In a present embodiment, computing device 54 is a mobile electronic device with the combined functionality of a personal digital assistant, a cell phone, and an email paging device. (Although variants on device 54 can include a laptop computer or a desktop computer.) Many well known cellular telephone models, or variants thereof, are suitable for the present embodiment.

Device 54 thus includes a plurality of input devices which in a present embodiment include a keyboard 100, a pointing device 102, and a microphone 104. Pointing device 102 can be implemented as a track wheel, trackball or the like. Other input devices, such as a touch screen, are also contemplated. Input from keyboard 100, pointing device 102 and microphone 104 is received at a processor 108. Processor 108 is configured to communicate with a non-volatile storage unit 112 (e.g. Erasable Electronic Programmable Read Only Memory ("EEPROM"), Flash Memory) and a volatile storage unit 116 (e.g. random access memory ("RAM")). Programming instructions that implement the functional teachings of device 54 as described herein are typically maintained, persistently, in non-volatile storage unit 112 and used by processor 108 which makes appropriate utilization of volatile storage 116 during the execution of such programming instructions.

Processor 108 in turn is also configured to control a speaker 120 and a display 124. Processor 108 also contains a plurality of network interfaces 128, which are implemented in a present embodiment as radios configured to communicate over respective bearer paths 70. In general, it will be understood that interfaces 128 are configured to correspond with the network architecture that defines each link 70. It should be understood that in general a wide variety of configurations for device 54 are contemplated.

In a present embodiment, device 54 is also configured to maintain a web-browser application 136. Web-browser application 136 is maintained within non-volatile storage 112. Processor 108 is configured to execute web-browser application 136, receive input from keyboard 100 relative to web-browser application 136, and to generate graphical interfaces on display. Processor 108 is further configured to request content from network 74 via an appropriate bearer path 70, as will be discussed further below.

In a present embodiment, device 54 is also configured to maintain an interface selector application 140. Interface selector application 140 is maintained within non-volatile storage 112. Processor 108 is configured to execute interface selector application 140 in order to select one or more interfaces 128 and the corresponding bearer paths 70, as will be discussed further below.

Device 54 also includes a battery 144 or other power supply. Battery 144 provides power to components within device 54. Of note is that the rate of drain on battery 144 varies according to which interface 128 is active. In the present example, interface 128-3 has the greatest power consumption in relation to interface 128-2. In turn, interface 128-2 consumes more power than interface 128-1. Therefore, interface 128-3 drains battery 144 at a greater rate than interface 128-2, and interface 128-2 drains battery 144 at a greater rate than interface 128-1.

Server 58 can be based on any well-known server environment including a module that houses one or more central processing units, volatile memory (e.g. random access memory), persistent memory (e.g. hard disk devices) and network interfaces to allow server 58 to communicate over network 74 and with base station 62. For example, server 58 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 58 is contemplated.

Figure 3:
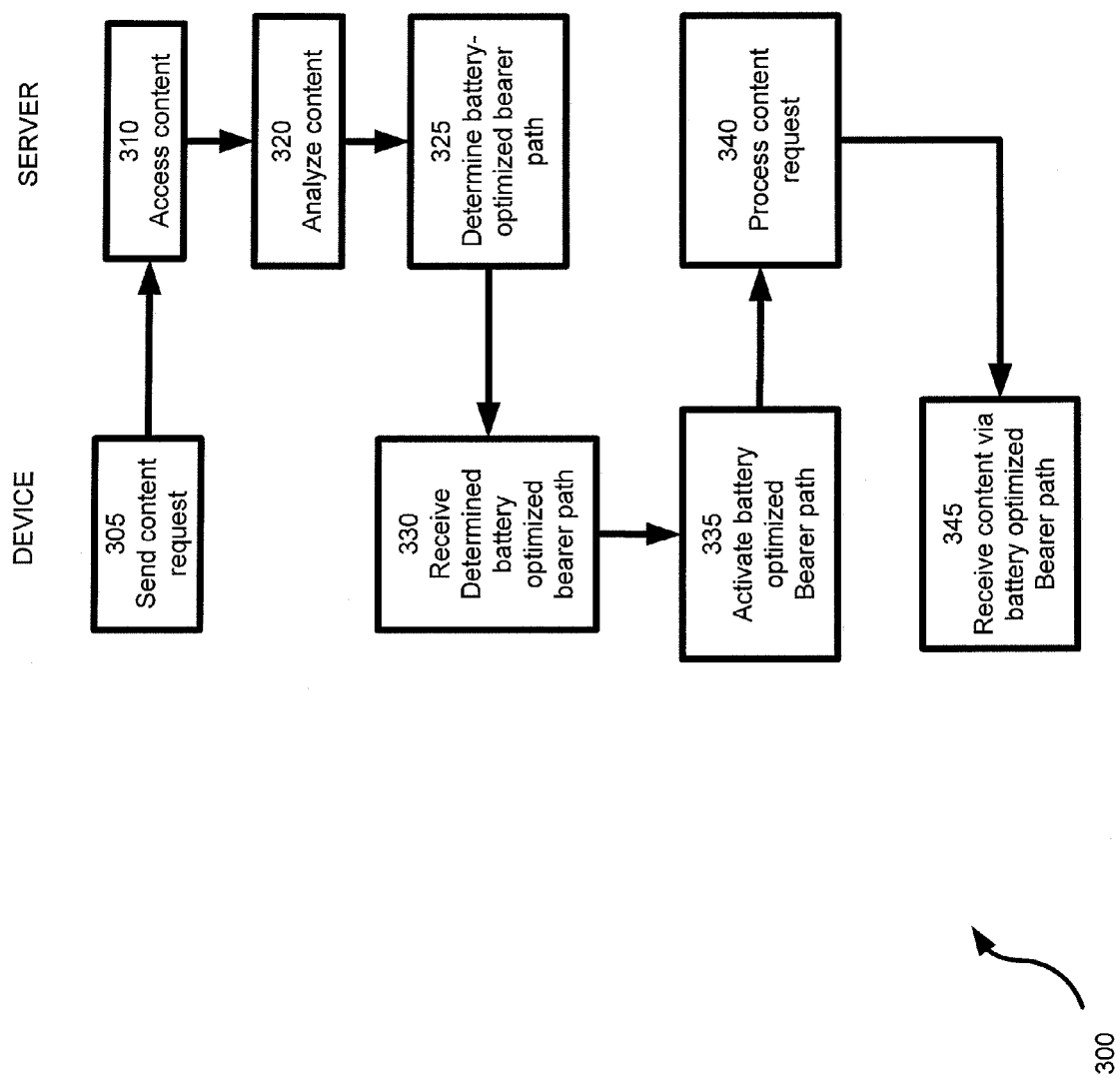
FIG. 3 shows a flow-chart depicting a method for battery life management.

Referring now to FIG. 3, a flowchart depicting a method of managing battery resource via traffic steering is indicated generally at 300. Method 300 can be implemented on system 50 or a suitable variation thereof. Block 305 comprises sending a content request from a wireless electronic device, which in turn is received at an intermediation server. In a present embodiment, the request is sent from device 54 to server 58 via any bearer path 70, using any appropriate channel on that bearer path 70 that is active at the time the request is generated. In a present embodiment the content request is generated by web-browser application 136 on device 54, which is selecting a web-page hosted on a web-server (not shown) connected to network 74.

At block 310, server 58 has received the content request from block 305 and accesses the requested content. In the present example, server 58 will access the appropriate web-server on network 74 in order to fulfill block 310. At block 320, the content accessed at block 310 is analyzed. Such an analysis, in the case of web-content, can include, for example, analyzing the selected web-page for the number of frames, streaming media, scripts and other constituent elements of that web-page.

Block 325 comprises determining the battery-optimized bearer path associated with the content analyzed at block 320. For example, assume the selected web-page at block 320 includes streaming media having bandwidth speeds that require 3G and which would be too slow over EDGE to deliver the proper content experience. In this first example, the determination at block 325 comprises determining that 3G bearer path 70-3 is required in order to actually deliver the selected content, and therefore 3G bearer path 70-3 is determined to be the battery-optimized bearer path. As a second example, assume that the selected web-page at block 320 includes no frames, streaming media or scripts and includes very little hyper-text mark up language (HTML) but is predominantly American Standard Code for Information Interchange (ASCII) text. In this second example, the determination at block 325 comprises determining that 3G bearer path 70-3 is NOT required in order to actually deliver the selected content, and that EDGE bearer path 70-2 can efficiently deliver the requested HTML and ASCII, in which case EDGE bearer path 70-2 is determined to be the battery-optimized bearer path.

Block 330 comprises receiving at the device the determined battery-optimized bearer path. Block 330 can be effected by server 58 sending the determination made at block 325 via any bearer path 70, using any appropriate channel on that bearer path 70 that is active at the time the determination at block 325 is effected. (The bearer path 70 and appropriate channel on that bearer path 70 can be the same as those used to effect block 325 as discussed above, and indeed the reply of the determined battery-optimized bearer path can be responsive to the request from block 305).

Block 335 comprises activating the battery-optimized bearer path. In the present example, block 335 can be effected by interface selector application 140. Those skilled in the art will appreciate that where the battery-optimized bearer path is already active, then no actual action need be effected by interface selector application 140. For the sake of explanation however, assume that 3G bearer path 70-3 was active, but that the analysis at block 320 indicated that the requested webpage at block 305 was predominantly ASCII text with a small amount of HTML, and therefore that the battery-optimized bearer path as determined at block 325 is EDGE bearer path 70-2. Using this assumption, then at block 335 interface selector application 140 will indicate instructions to processor 108 so as to control device 54 so as to deactivate interface 128-3 and deactivate 3G bearer path 70-3, and activate interface 128-2 and EDGE bearer path 70-2.

(It is also contemplated that, in certain embodiments, device 54 is configured to always default to a bearer path (e.g. EDGE) that consumes less power than another bearer path (e.g. 3G), and therefore during method 300, device 54 will only move to the 3G bearer path for brief periods to effect certain content requests, thereafter defaulting back to the EDGE bearer path.)

Block 340 comprises processing content request. In a present embodiment, block 340 is performed by server 58 and occurs subsequent to block 335. Where block 340 is performed by server 58, then block 340 can be contingent on receipt of an acknowledgement at server 58 that the determined battery-optimized bearer path has been activated. Such receipt of acknowledgment can be implicit, by communicating with base station 62 using the activated bearer path to ascertain that base station 62 is now communicating with device 54 via the determined battery-optimized bearer path, or it can be explicit by waiting for device 54 to send an express indication that block 335 has been effected.

Block 345 comprises receiving the content via the battery-optimized bearer path at the device. Thus, continuing with the example above where EDGE bearer path 70-2 has been activated, then at block 345 the requested predominantly ASCII text with a small amount of HTML web-page can actually be delivered over EDGE bearer path 70-2 to device 54.

Variations on the foregoing are contemplated. For example, other types of content requests, from other types of applications (not discussed herein) on device 54 are contemplated. For example, device 54 can also include an email application and the content request can be for email. Other content request examples include media (e.g. video or audio), instant messaging, mapping services (e.g. Google maps), voice-over-Internet-protocol, social networking services (e.g. Facebook). Also note that the content may not necessarily be hosted on network 74, but can be content actually hosted, or at least cached, on server 58 itself.

It should be understood that the types of analysis performed at block 320 are not particularly limited and can correspond to the content type. For example where the content is email, then the analysis can include header parsing for size of the message or type of Multipart Internet Mail Extension (MIME).

Such content analysis can also be to gauge complexity of embedded graphics or media.

Such content analysis can also be based on traffic profiles associated with a request based on real-time analysis and/or predetermined rankings.

Such content analysis can also be based on a combination of known handheld capabilities and traffic profile to determine available transport bearer list ordered by the most optimal according to battery resources of the device.

Content analysis at block 320 and/or determinations at block 325 can also be based on historic data that includes analysis of which bearer paths 70 deplete battery 144 most quickly as corresponded to types of content carried over that particular bearer path 70.

Note, as a further variation, intermediation server 58 can be configured to perform content optimization functions whereby content requested from network 74 for device 54 is adjusted or modified into a format that conforms to the functionality of web-browser application 136 and other constraints of device 54. In this variation, method 300 can be effected as part of the optimization functions. Furthermore, the content optimization functions can be structured so as to package content, if possible, into a format that makes use of a bearer path 70 that consumes fewer battery resources on device 54.

As a still further variation, blocks 310-325 can be performed on a polling basis, without waiting for block 305. By polling basis, it is meant that server 58 can regularly access and analyze content on network 74, without waiting for block 305 to be effected. In this fashion, the determination of a battery-optimized bearer path can be determined in advance of any request at block 305 allowing for a faster response. Likewise, device 54 can be configured to maintain a cache corresponding to various battery-optimized bearer paths, as determined by server 58, thereby performing blocks 310-330 in advance of any actual request for content consistent with block 305.

Figure 4:
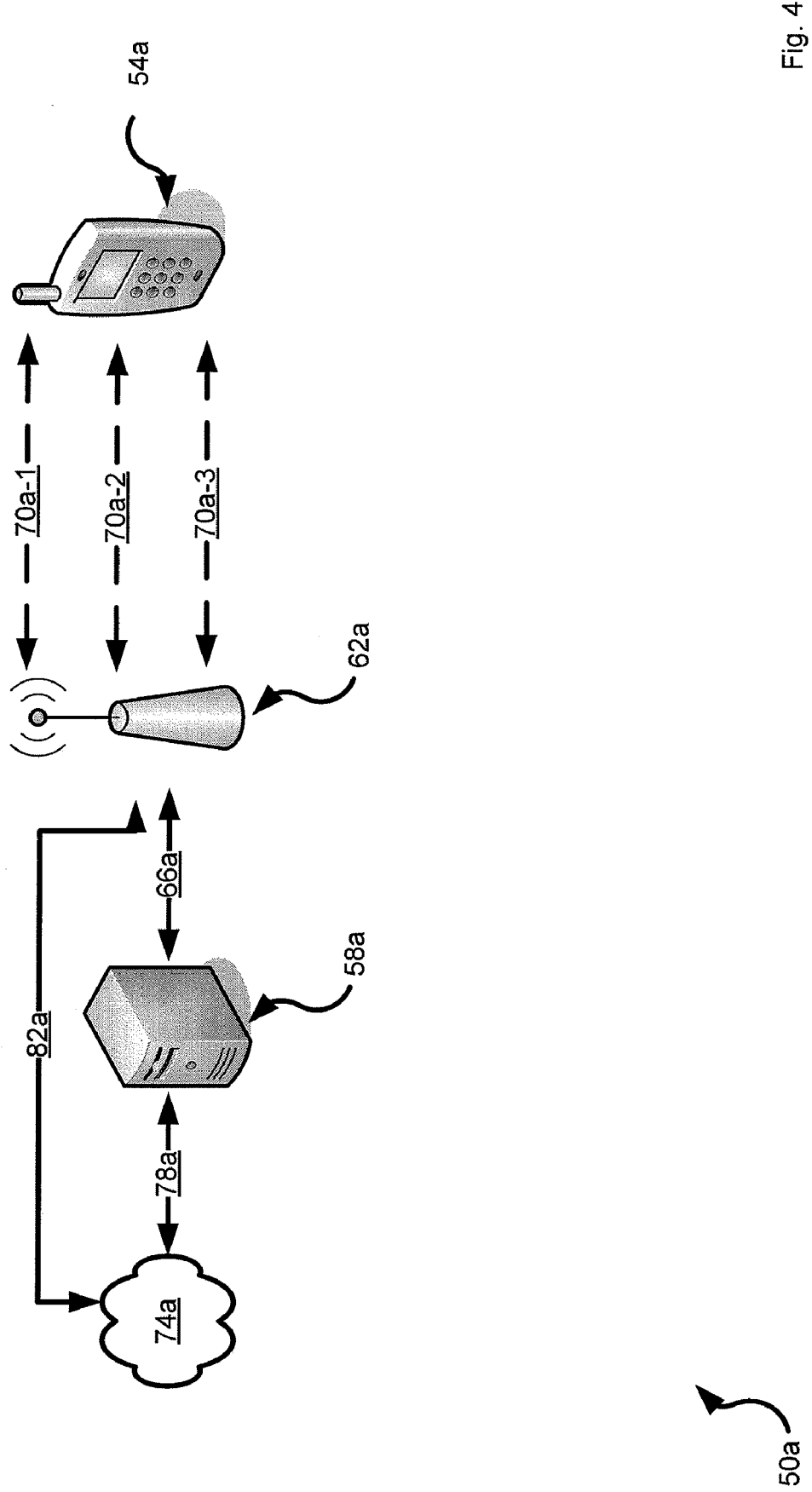
FIG. 4 shows a schematic representation of a system for battery life management as a variation on the system of FIG. 1.

As a further example of a variation on the foregoing, FIG. 4 shows system 50a which is a variation on system 50 and like elements in system 50a include like references to their counterparts in system 50, except followed by the suffix "a". However, unlike system 50, system 50a also includes a direct link 82a from base station 62a to network 74a that bypasses server 58a. In system 50a, as a variation on method 300, block 340 is performed by device 54a itself, (having already activated the battery-optimized link), whereby device 54 actually requests the content directly from network 74a, bypassing intermediation server 58a via direct link 82a. In this variation, server 58a is used to determine the battery-optimized bearer path and to advise device 54a, but otherwise device 54a effects a direct request for the content.

Figure 5:
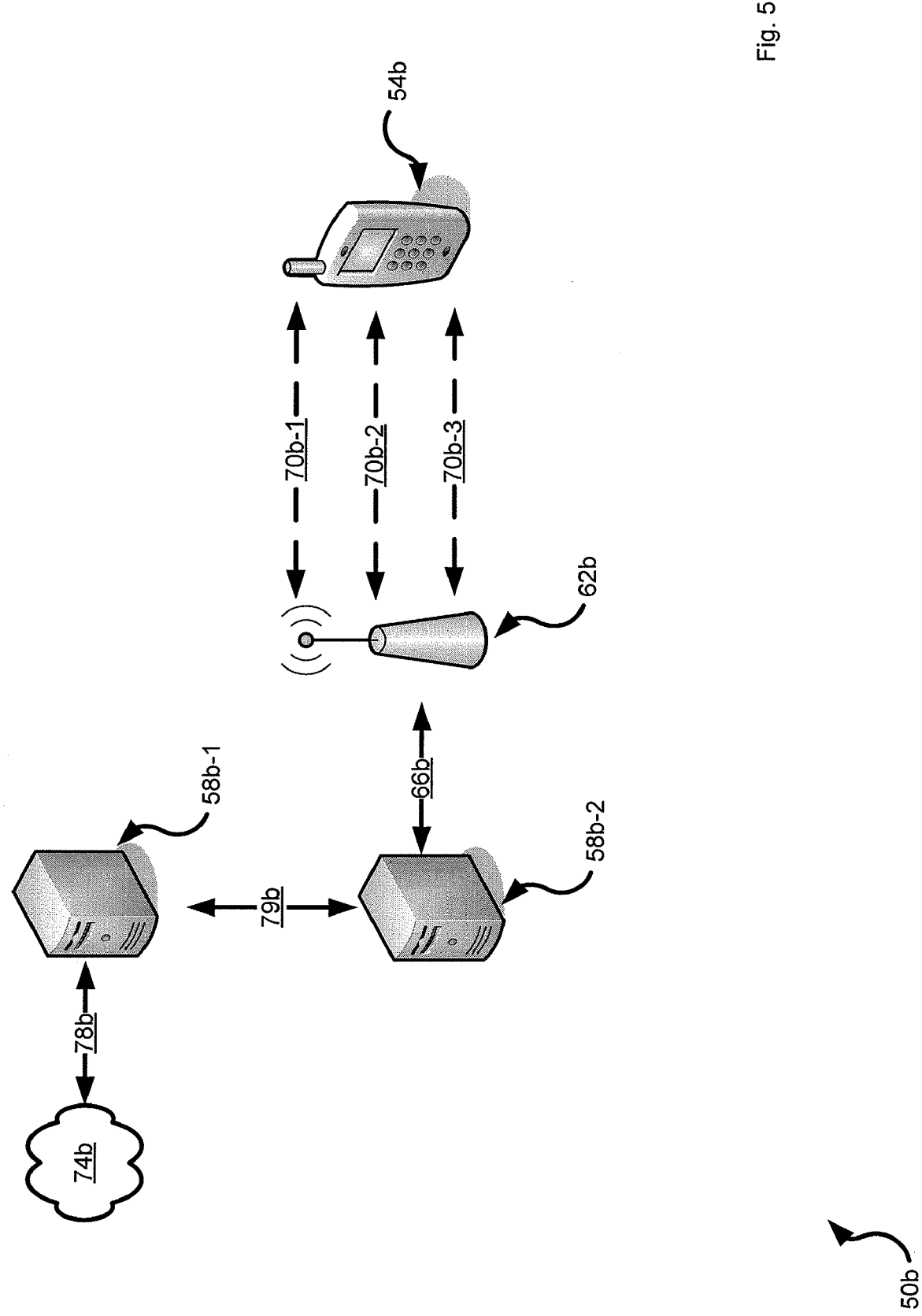
FIG. 5 shows a schematic representation of a system for battery life management as a variation on the system of FIG. 1.

As a further example of a variation on the foregoing, FIG. 5 shows system 50b which is a variation on system 50 and like elements in system 50b include like references to their counterparts in system 50, except followed by the suffix "b". However, unlike system 50, in system 50b, server 58 is implemented as a first server 58b-1 and a second server 58b-2, and a link 79b is provided between server 58b-1 and server 58b-2.

In system 50b, server 58b-1 can be implemented, in a non-limiting example, as an enterprise server, such as a Blackberry Enterprise Server that is hosted and maintained by an enterprise that is associated with device 54b whereas server 58b-2 can be implemented as a relay server such as a Relay Server that is hosted and maintained by a carrier, or a carrier partner such as Research In Motion Inc. However, the entity or entities that host(s) and maintain(s) each server 58b-1 and server 58b-2 is not particularly limited and is discussed herein as an example of a potential real-world implementation. In terms of technical structure, and as will become apparent from the discussion below, server 58b-1 can be referred to as a content intermediation server 58-1, whereas server 58b-2 can be referred to as a transport intermediation server.

Figure 6:
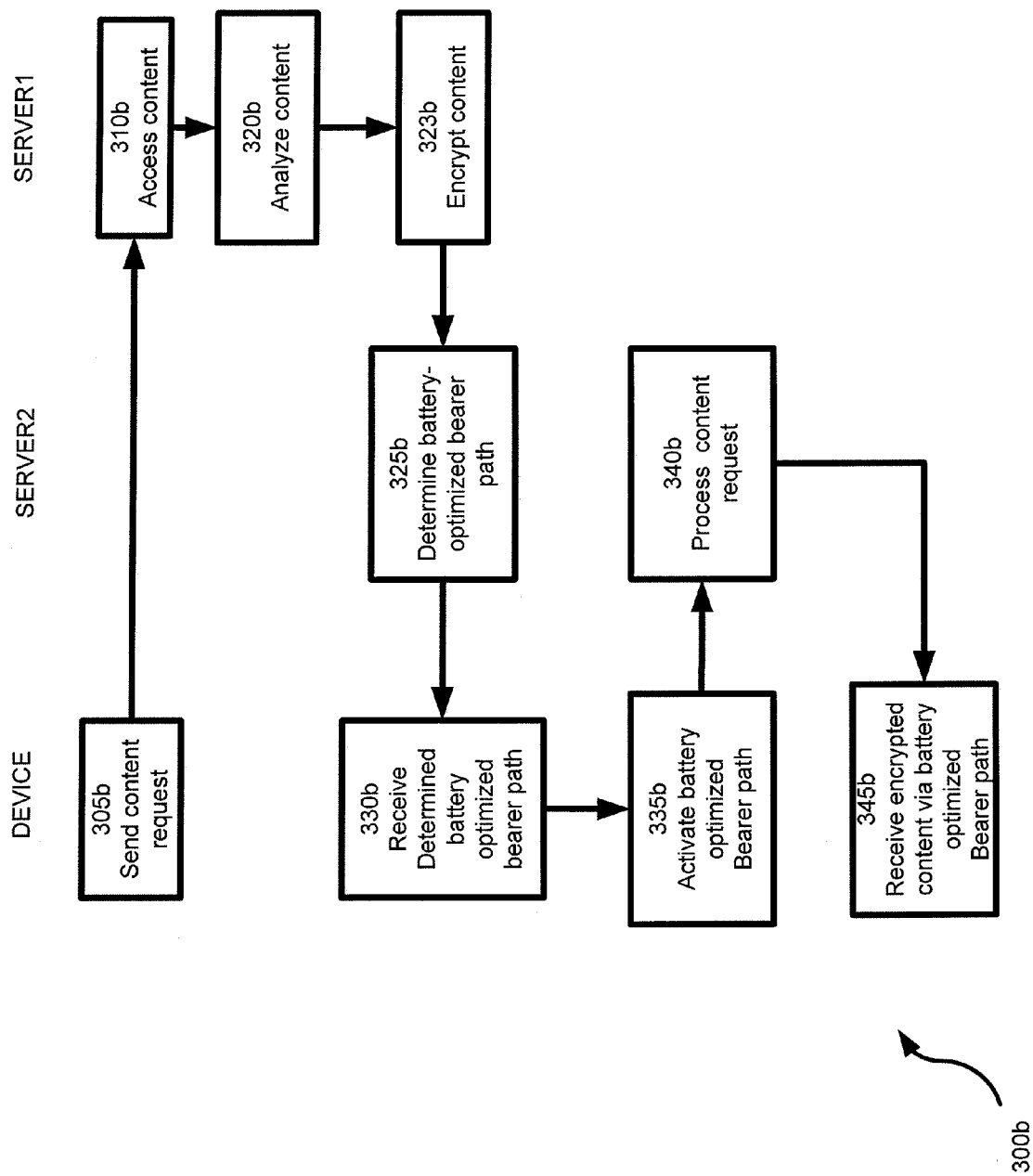
FIG. 6 shows a flow-chart depicting another method for battery life management based on the system of FIG. 5.

Referring now to FIG. 6, a flowchart depicting a method of managing battery resource via traffic steering is indicated generally at 300b. Method 300b can be implemented on system 50b or a suitable variation thereof. Block 305b comprises sending a content request from a wireless electronic device, which in turn is received at a first intermediation server. In a present embodiment, the request is sent from device 54b to server 58b-1 via any bearer path 70b (using any appropriate channel on that bearer path 70b, that is active at the time the request is generated) and in turn via server 58b-2. In a present embodiment, the content request is generated by web-browser application 136 on device 54b, which is selecting a web-page hosted on a web-server (not shown) connected to network 74b. The request at block 305b can be sent in an encrypted format such that server 58b-2 passes the encrypted request through to server 58b-1, and server 58b-1 decrypts the request.

At block 310b, server 58b-1 has received the content request from block 305b and accesses the requested content. In the present example, server 58b-1 will access the appropriate web-server on network 74b in order to fulfill block 310b. At block 320b, the content accessed at block 310b is analyzed. Such an analysis, in the case of web-content, can include, for example, analyzing the selected web-page for the number of frames, streaming media, scripts and other constituent elements of that web-page.

Block 323b comprises encrypting the content. In this manner the actual content that is ultimately destined for device 54b can be kept confidential during transmission from server 58b-1 to electronic device 54b. (It will thus now be apparent that server 58b-1 and device 54b maintain key pairs or other encryption/decryption functionality).

At this point, server 58b-1 sends a) the content in encrypted form; and b) an unencrypted header file that includes the results of the analysis from block 320b; to server 58b-2.

At block 325b, server 58b-2 has received this data. Block 325b comprises determining the battery-optimized bearer path associated with the content analyzed at block 320b. The determination is based on contents of the unencrypted header file that includes the results from block 320b. Block 325b is otherwise performed in substantially the same manner as block 320 from method 300. Block 330b and block 335b are also performed substantially in the same manner as block 330 and block 335, respectively, from method 300.

Block 340b comprises processing content request. Block 340b is also performed in substantially the same manner as block 340 from method 300, except that in block 340b the encrypted version of the content (as encrypted at block 323b) is maintained at server 58b-2 and sent to device 54b.

Block 345b is otherwise performed in substantially the same manner as block 345 from method 300.

(Note that, as a variation of the foregoing, block 340b need not be performed by server 58b-2 but can be performed elsewhere, thus limiting the functionality of server 58b-2 to the actual setting up of the appropriate bearer path 70b. In this variation, server 58b-1 need not actually pass the encrypted content to server 58b-2.)

Figure 7:
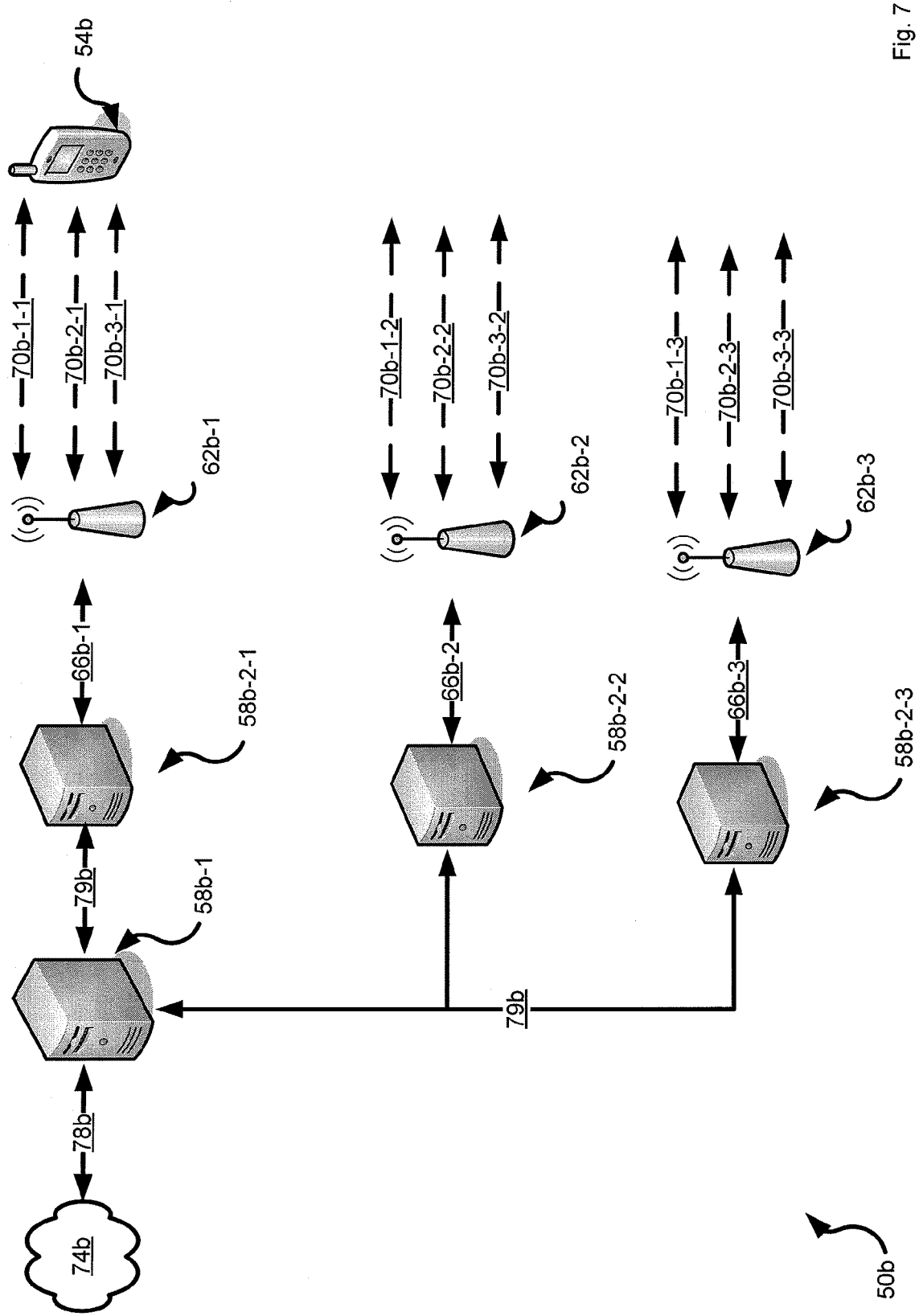
FIG. 7 shows a further schematic representation of the system from FIG. 5 when scaled to a larger deployment.

Note that, advantageously in method 300b, server 58b-1 need not understand the nature of paths 70b or the capabilities of device 54b, and therefore functionality for block 325b is shifted onto server 58b-2 in a manner that does not burden the computing resources of server 58b-1. At the same time, content is still encrypted between server 58b-1 and device 54b. This becomes even more advantageous when system 50b is scaled to include multiple content servers 58b-1 or multiple transport servers 58b-2 or both. FIG. 7 shows an example where system 50b is scaled to include three transport servers 58b-2-1, 58b-2-2 and 58b-2-3, each of which connect to their own base stations 62b and bearer paths 70b. Device 54b is capable of "roaming" to connect with those different base stations 62b-1, 62b-2, 62b-3. Each of those base stations 62b-1, 62b-2, 62b-3 can be located anywhere in the world, and it is contemplated that each base station 62b-1, 62b-2 and 62b-3 can be based on different infrastructures or architectures and each respective bearer path 70b can likewise vary across different base stations 62b. For example, bearer paths 70b-1-1, 70b-2-1 and 70b-3-1 can correspond to bearer paths 70b-1, 70b-2 and 70b-3, while bearer path 70b-2-1 can be based on 4G, bearer path 70b-2-2 can be based on Worldwide Interoperability for Microwave Access, (WiMAX) and bearer path 70b-2-3 can be based on Institute of Electrical and Electronics Engineers (IEEE) 802.11. According to this specific example, each transport server 58b-2 can be configured to maintain network infrastructure data representing the configuration of its respective bearer paths 70b, as well as to maintain data representing the capabilities of device 54b to actually utilize such bearer paths, such that each transport server 58b-2 can perform step 325b based on the content analysis of step 320b, as well as the network infrastructure data and capabilities of device 54b which are locally maintained in each transport server 58b. In this manner, the computing resources of content server 58b-1 need not be burdened with maintaining data relative to upgrades or changes that can occur to the various bearer paths 70b and the corresponding upgrades or changes to the capabilities of device 54b, which may also be upgraded from time to time. Those skilled in the art will now recognize that system 50b can also be scaled to include multiple devices 54b, each with different capabilities, and multiple content servers 58b, and thereby articulate a system that further benefits from these and other advantages. In such a scaled configuration, one or more devices 54b can be paired with one or more content servers 58b for security or encryption or both, but at the same time the bearer path selection functionality is maintained by each server 58b.

Combinations and subsets of the variations are also contemplated. For example, particularly in system 50b and its scaled versions, content server 58b-1 can be configured to simply determine the size of the content at block 320, and to forward that sizing information to transport server 58b-2. The transport server 58b-2 can be configured to select a bearer path 70b based on the size, on the basis that beyond a predefined size of the content, a higher bearer path (e.g. 3G is higher than EDGE) will be warranted, but below that predefined size a lower bearer path (e.g. EDGE is lower than 3G) will be warranted. The predefined size threshold can be based on the size of the channel overhead that is necessary to set up the higher bearer path, such that if the size of the content is sufficiently great it will justify expending the channel overhead setup for the higher bearer path, but if the size of the content is not sufficiently great then the lower bearer path is justified. In this configuration, it can be desired to configure system 50b such that device 54b is defaulted to the lower bearer path, and device 54b will only be transitioned to a higher bearer path on an as needed basis using method 300b to fetch content beyond the predefined size, after which device 54b will be automatically transitioned to the lower bearer path.

It should be understood that the type of content need not be limited to web-pages, and can include emails, media, applications, application data, or any other type of content that device 54b can be configured to access from network 74b.

Figure 8:
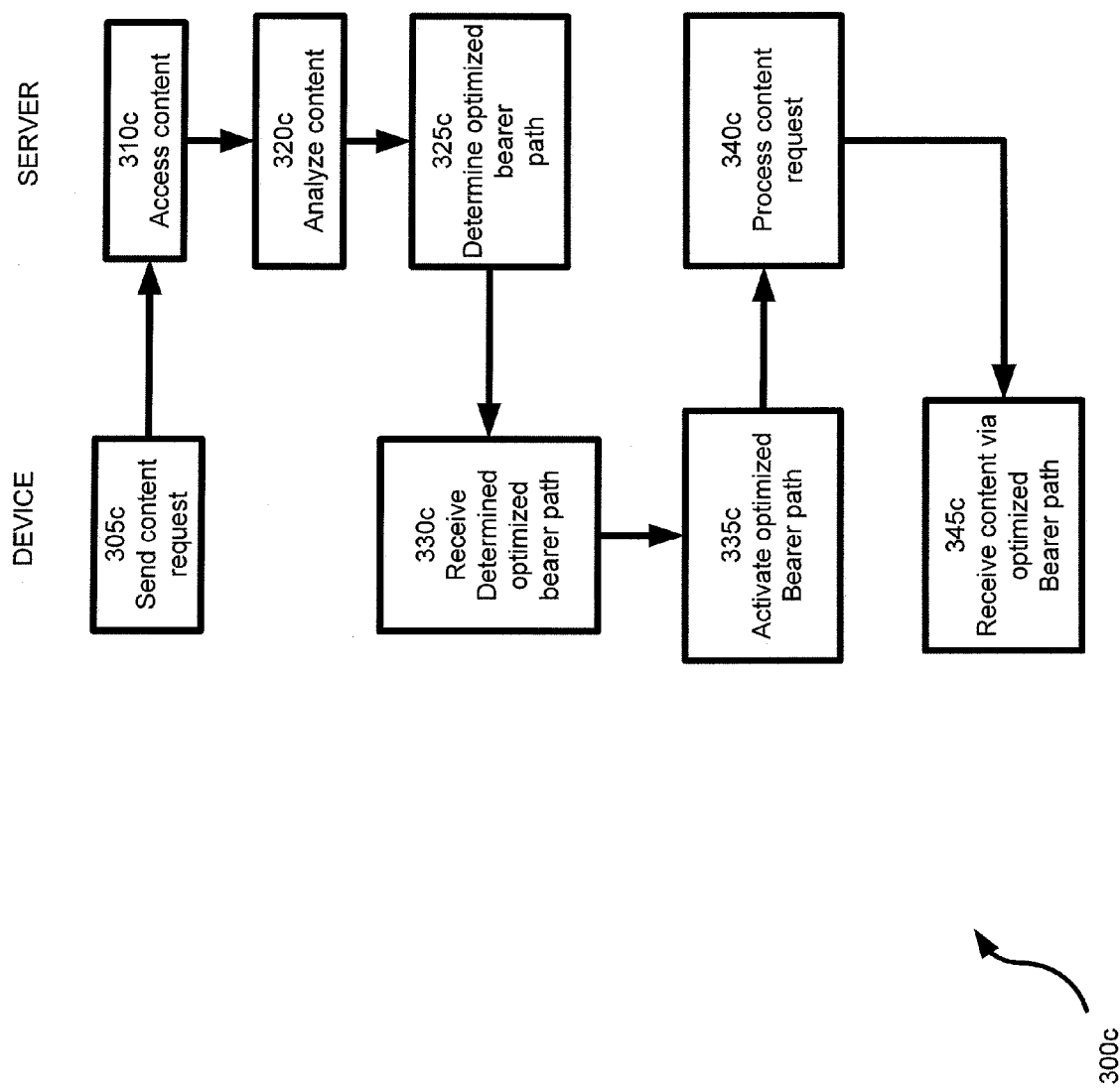
FIG. 8 shows a flow-chart depicting a method for optimal bearer path selection as a variation on the method of FIG. 3 that can be used with the systems or their variations described herein.

Referring now to FIG. 8, a flowchart depicting a method of selecting an optimal bearer path is indicated generally at 300c. Method 300c can be implemented on system 50 or a suitable variation thereof. Method 300c can also be varied in substantially the same manner that method 300 is varied to provide method 300b.

Of note is that in method 300c, at block 325c server 58 determines an optimal bearer path and at block 330c device 54 receives the determined optimal bearer from server 58. The determination at block 325c can be based on a different criteria, other than, or in addition to, whether or not the consumption of battery 144 resources is optimized.

Exemplary criteria include, but are not limited to, the overall speed at which content can be expected to be delivered over a particular bearer path 70. For example, notwithstanding the fact that the bearer path 70 that has the greatest speed (e.g. 3G as opposed to EDGE) has been selected on device 54, server 58 can be configured to analyze the requested content at block 320, and compare that analysis with known conditions of link 66 and bearer paths 70, to verify that the selected bearer path is indeed capable of delivering the content at the greatest speed. While counterintuitive from the perspective of device 54, it is possible in certain circumstances that an EDGE bearer path 70 can be capable of delivering certain content at greater speeds than a 3G bearer path 70, and server 58 can be so equipped to ascertain this fact. Such circumstances can include congestion over 3G bearer path 70, or environmental factors such as weather. Having made such a determination, server 58 can advise device 54 at block 330c as to which bearer path 70 will in fact deliver the greatest speeds.

Figure 9:
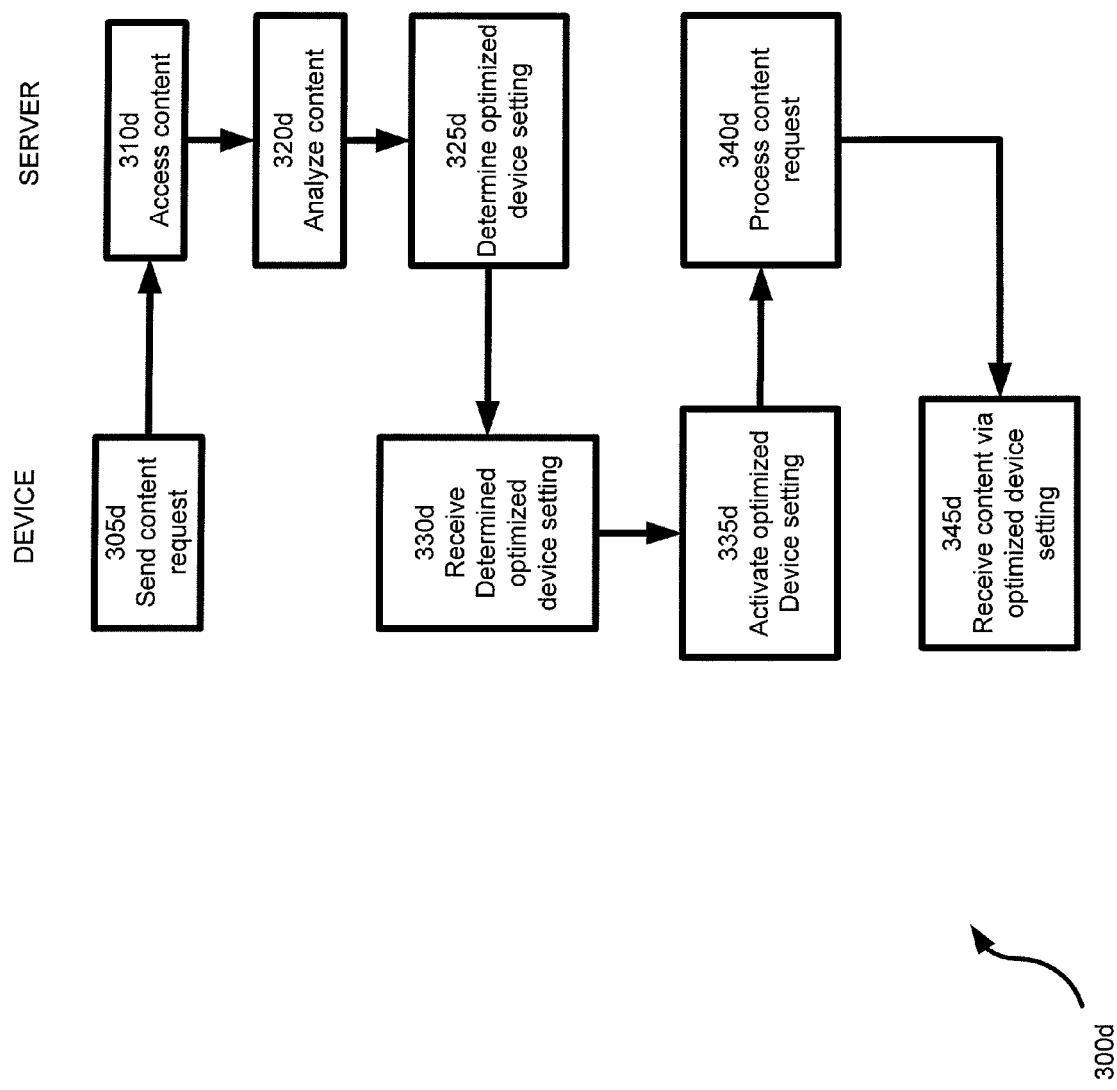
FIG. 9 shows a flow-chart depicting a method for optimal bearer path selection as a variation on the method of FIG. 3 that can be used with the systems or their variations described herein.

Referring now to FIG. 9, a flowchart depicting a method of selecting an optimal bearer path is indicated generally at 300d. Method 300d can be implemented on system 50 or a suitable variation thereof. Method 300d can also be varied in substantially the same manner that method 300 is varied to provide method 300b. Method 300d is a variation of method 300. Of note is that in method 300d, at block 325d server 58 determines an optimal device setting and at block 330d device 54 receives the determined optimal device setting from server 58. The determination at block 325f can be based on a different criteria, other than, or in addition to, whether or not the consumption of battery 144 resources is optimized.

An exemplary criteria includes a determination as to whether the speed at which the content can be reasonably delivered, on any bearer path, is so low that there is an expectation that device 54 may determine that the actual content delivery has failed. In this example, the determination at block 325d can be "There is no available bearer path that will deliver reasonable speeds; cache the content request until such a bearer path becomes available and activate that bearer path prior to proceeding with content request". Block 335d will then provide for device 54 waiting until such a bearer path becomes available, and at that point activating that bearer path and thereafter method 300d continues as usual.

The claims attached hereto define the scope of the monopoly sought.

The invention claimed is:

1. A method of managing battery resources in a wireless device connected to a network via a plurality of bearer paths, said method comprising:
    receiving, at a first intermediation server, a content request from said wireless device via one of said bearer paths;
    performing, at a first intermediation server, an analysis of content associated with said content request;
    sending analysis results from said first intermediation server to a second intermediation server;
    determining, at said second intermediation server, a battery-optimized bearer path based on said analysis results; said battery-optimized bearer path determined according to which of said bearer paths consumes less battery resources of said wireless device than another one of said bearer paths, and which is also capable of fulfilling said content request;
    sending, from said second intermediation server, an indication of said battery-optimized bearer path to said wireless device via one of said bearer paths.

2. The method of claim 1 further comprising receiving said indication at said wireless device and selecting said battery-optimized bearer path.

3. The method of claim 2 further comprising receiving said content at said wireless device via said battery-optimized bearer path.

4. The method of claim 2 further comprising sending said content to said wireless device via said battery-optimized bearer path.

5. The method of claim 3 further comprising optimizing said content according to the hardware constraints of said wireless device prior to sending said content via said battery-optimized bearer path.

6. The method of claim 1 wherein said content is at least one of web-pages, email, audio media, video media, streaming media, instant messaging, mapping services, voice-over-Internet-protocol communications, and social networking services.

7. The method of claim 1 wherein said analysis comprises analyzing complexity of embedded graphics or media within said content.

8. The method of claim 1 wherein said analysis comprises an examination of traffic profiles associated with said content request based on real-time analysis.

9. The method of claim 1 wherein said analysis comprises an examination of traffic profiles associated with said content request based on predetermined ranking ordered by the most optimal according to battery resource consumption of said device.

10. The method of claim 1 wherein a first one of said bearer paths is based on EDGE, and a second of said bearer paths is based on 3G.

11. The method of claim 1 further comprising encrypting said content at said first intermediation server for decryption by said wireless device.

* * * * *